United States Patent
Ho

(10) Patent No.: US 9,476,523 B2
(45) Date of Patent: Oct. 25, 2016

(54) MOUNTING BRACKET FOR A SHOWER HEAD

(71) Applicant: Chin-Hua Ho, Changhua (TW)

(72) Inventor: Chin-Hua Ho, Changhua (TW)

(73) Assignee: Chyi Liou Enterprise Co., Ltd., Changhua (TW)

( * ) Notice: Subject to any disclaimer, the term of this patent is extended or adjusted under 35 U.S.C. 154(b) by 0 days.

(21) Appl. No.: 15/081,927

(22) Filed: Mar. 27, 2016

(65) Prior Publication Data

US 2016/0208463 A1  Jul. 21, 2016

(51) Int. Cl.
*A47K 3/20* (2006.01)
*F16L 3/08* (2006.01)
*E03C 1/04* (2006.01)
*E03C 1/06* (2006.01)
*F16K 11/044* (2006.01)

(52) U.S. Cl.
CPC ............... *F16L 3/08* (2013.01); *E03C 1/0408* (2013.01); *E03C 1/066* (2013.01); *F16K 11/044* (2013.01); *E03C 2201/50* (2013.01)

(58) Field of Classification Search
CPC ........ E03C 1/06; E03C 1/0408; E03C 1/066; E03C 1/046; E03C 1/0404; E03C 2201/30; E03C 1/0409; E03C 1/00; E03C 1/04; E03C 1/042; E03C 2001/0415; E03C 1/055; E03C 1/021; E03C 1/023; E03C 1/05

USPC .............. 248/295.11, 296.1, 297.21, 288.11, 248/291.1, 292.13, 230.1, 230.2, 231.31; 4/567, 596, 601, 615
See application file for complete search history.

(56) References Cited

U.S. PATENT DOCUMENTS

| | | | |
|---|---|---|---|
| 5,749,552 A * | 5/1998 | Fan .................... | E03C 1/066 248/205.8 |
| 6,611,971 B1 * | 9/2003 | Antoniello ............ | E03C 1/0408 137/218 |
| 2008/0250556 A1 * | 10/2008 | Mang .................... | E03C 1/023 4/601 |

* cited by examiner

*Primary Examiner* — Steven Marsh

(57) ABSTRACT

A mounting bracket for a shower head includes a hollow, cylindrical mounting member including a recess, a channel, and external threads; a screw driven through the channel into a wall; a fastening element including a well, a protuberance, an annular flange, and a receptacle in the well; a sleeve including internal threads secured to the external threads to fasten the sleeve, the fastening element, and the mounting member together; a main body including a channel for receiving a section of a pipe, a hollow, cylindrical projection put on the protuberance to engage the flange, an externally threaded protrusion, and a tunnel member projecting out of the projection; a screw driven through the tunnel member into the receptacle to fasten the main body and the fastening element together; and a cap including internal threads secured to the protrusion to fasten the cap and the main body together.

1 Claim, 10 Drawing Sheets

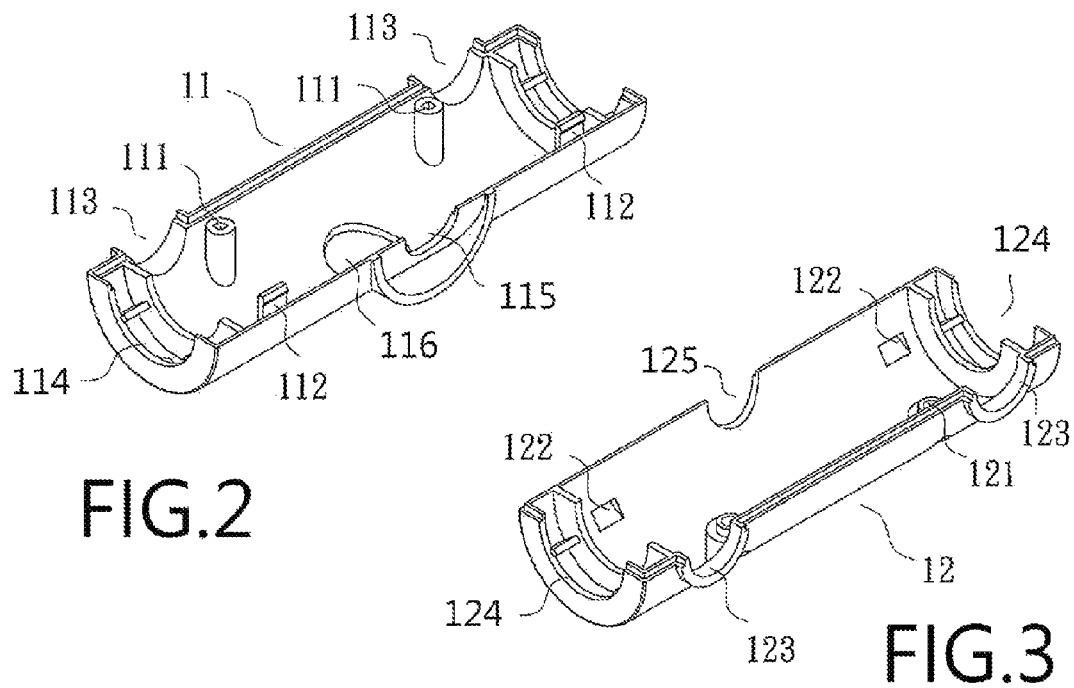
FIG.2
FIG.3
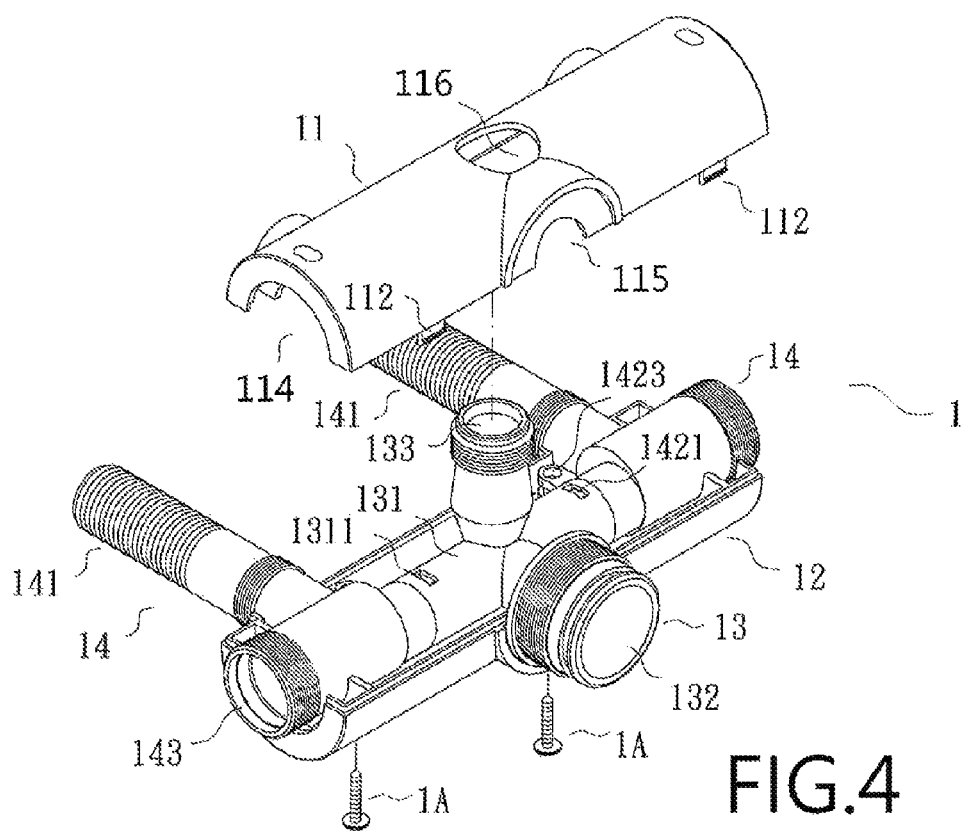
FIG.4

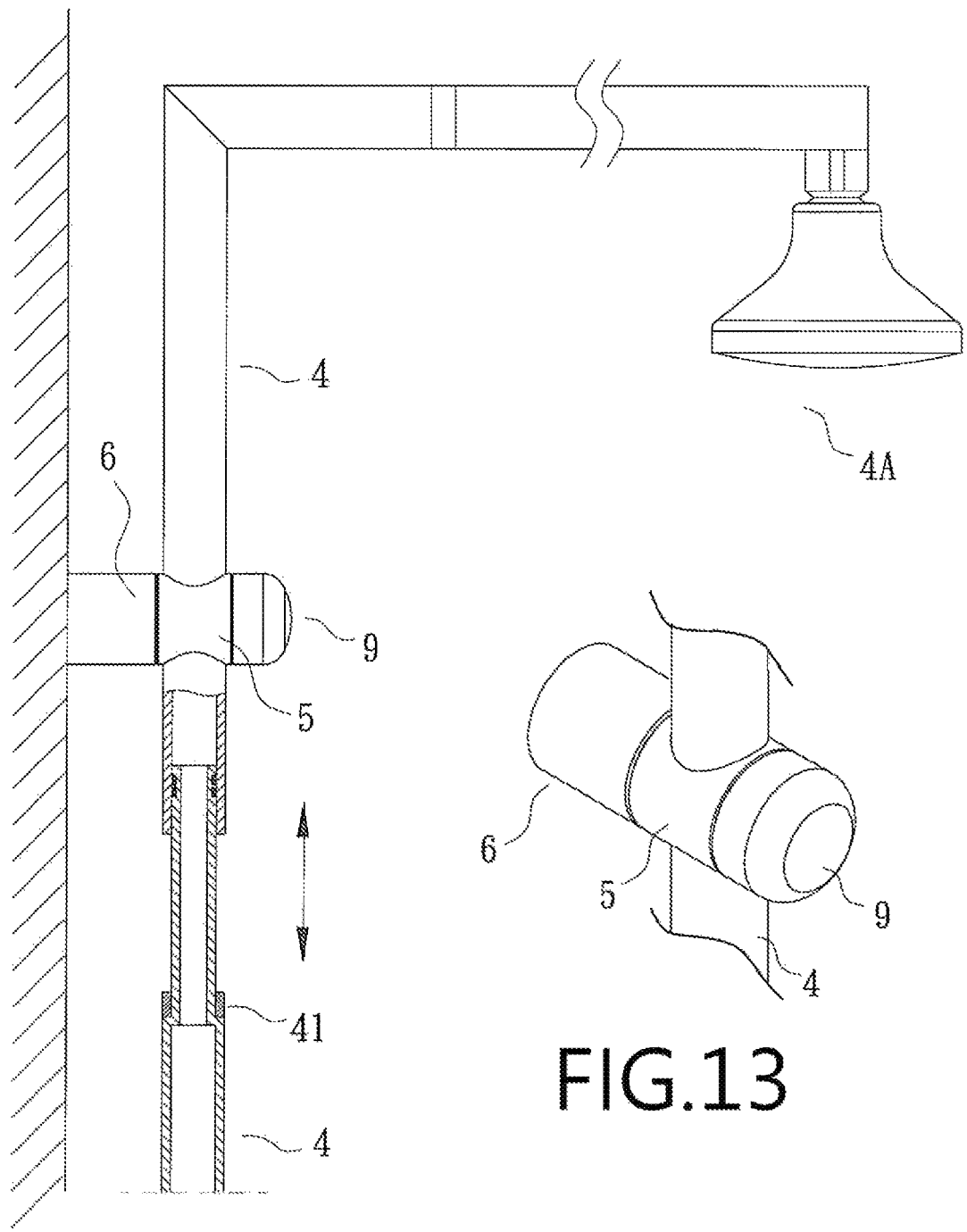

MOUNTING BRACKET FOR A SHOWER HEAD

BACKGROUND OF THE INVENTION

1. Field of the Invention

The invention relates to mounting brackets and more particularly to a mounting bracket for a shower head having water supplied from a tub faucet.

2. Description of Related Art

A conventional mounting assembly for a shower head comprises a mounting bracket configured to mount to a pipe passing through a shower wall, the pipe being configured to deliver water to a shower head; a telescopic arm secured to the mounting bracket; a multi-directional joint for securing a first end of the telescopic arm to the mounting bracket; and a shower head holder secured to the telescopic arm at a second end of the telescopic arm opposite the first end. The multi-directional joint is configured to rotate and pivot about the mounting bracket so that the telescopic arm is capable of rotating and pivoting in three dimensions with respect to the shower wall.

While the device enjoys its success in the market, continuing improvements in the exploitation of tub faucet of this type are constantly being sought.

SUMMARY OF THE INVENTION

It is therefore one object of the invention to provide a mounting bracket for a shower head, comprising a hollow, cylindrical mounting member including a recess at a first end, a channel at a second end and communicating with the recess, and external threads formed on an outer surface; a first fastener driven through the channel; a cylindrical fastening element including a well at a first end, a protuberance extending out of the first end, an annular flange formed on the protuberance, and a receptacle at a bottom of the well wherein the fastening element is partially disposed in the recess and the flange engages the first end of the mounting member; a sleeve including internal threads secured to the external threads of the mounting member to fasten the sleeve, the fastening element, and the mounting member together; a main body including a channel configured to receive a portion of a pipe passing through, a first end opening, a second end opening, a hollow, cylindrical projection extending out of the first end opening and put on the protuberance of the fastening element to engage the flange, an externally threaded protrusion extending out of the second end opening, and a tunnel member partially disposed in the projection and projecting out of the projection; a second fastener driven through the tunnel member into the receptacle of the fastening element to fasten the main body and the fastening element together; a first resilient fastening member disposed in the tunnel member for clamping the pipe; a second resilient fastening member disposed in the second end opening of the main body for clamping the pipe; and a cup-shaped cap including internal threads secured to the protrusion of the main body to fasten the cap and the main body together, and a hollow cylinder complimentarily engaged an outer surface of the second resilient fastening member.

The above and other objects, features and advantages of the invention will become apparent from the following detailed description taken with the accompanying drawings.

BRIEF DESCRIPTION OF THE DRAWINGS

FIG. 2 is a perspective view of the first shell;

FIG. 3 is a perspective view of the second shell;

FIG. 4 is an exploded perspective view showing the first shell to be mounted on the assembled first coupling, the second couplings, and the second shell;

FIG. 12 is an enlarged view of the upper portion of FIG. 10;

FIG. 13 is a perspective view of the mounting bracket and the pipe passing through;

DETAILED DESCRIPTION OF THE INVENTION

Figure 1:
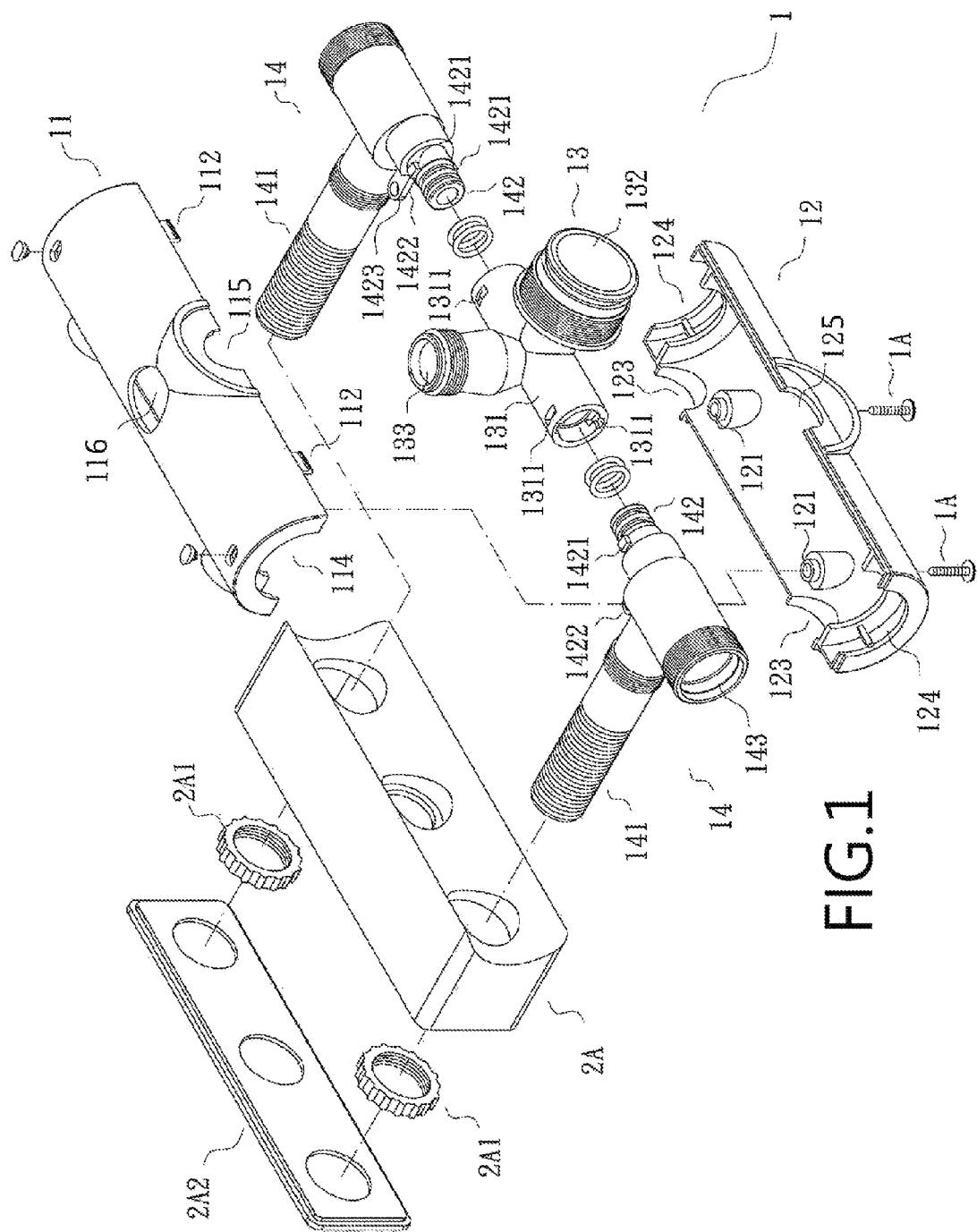
FIG. 1 is a perspective view of a tub faucet for a shower head according to the invention.
Figure 5:
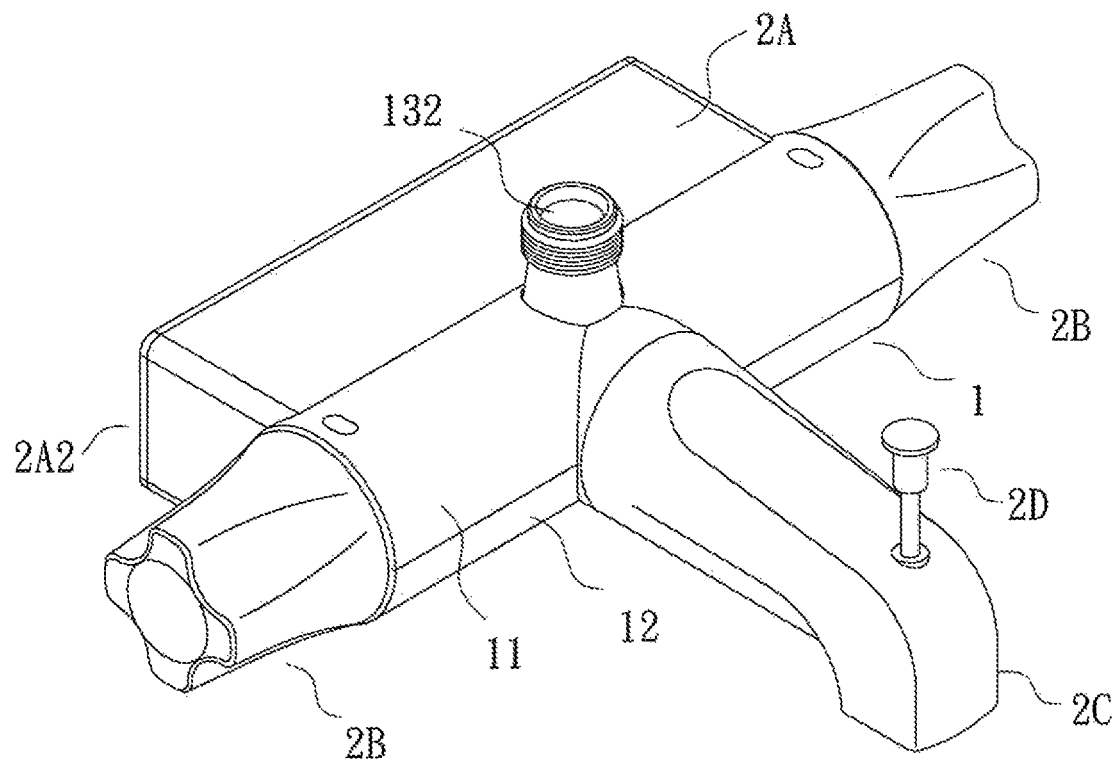
FIG. 5 is a perspective view of the assembled tub faucet.
Figure 6:
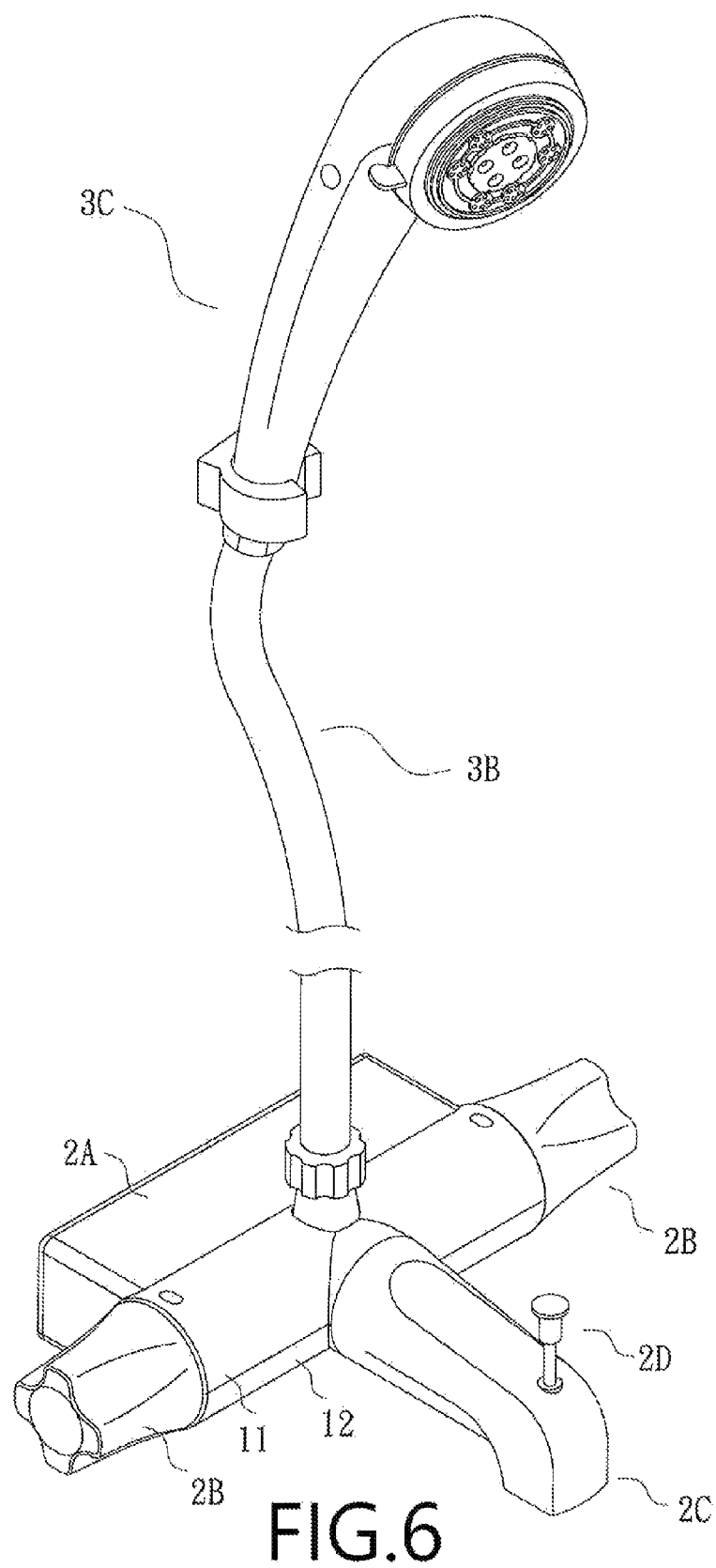
FIG. 6 is a perspective view of the tub faucet of FIG. 5 and a hand-held shower attached thereto.
Figure 7:
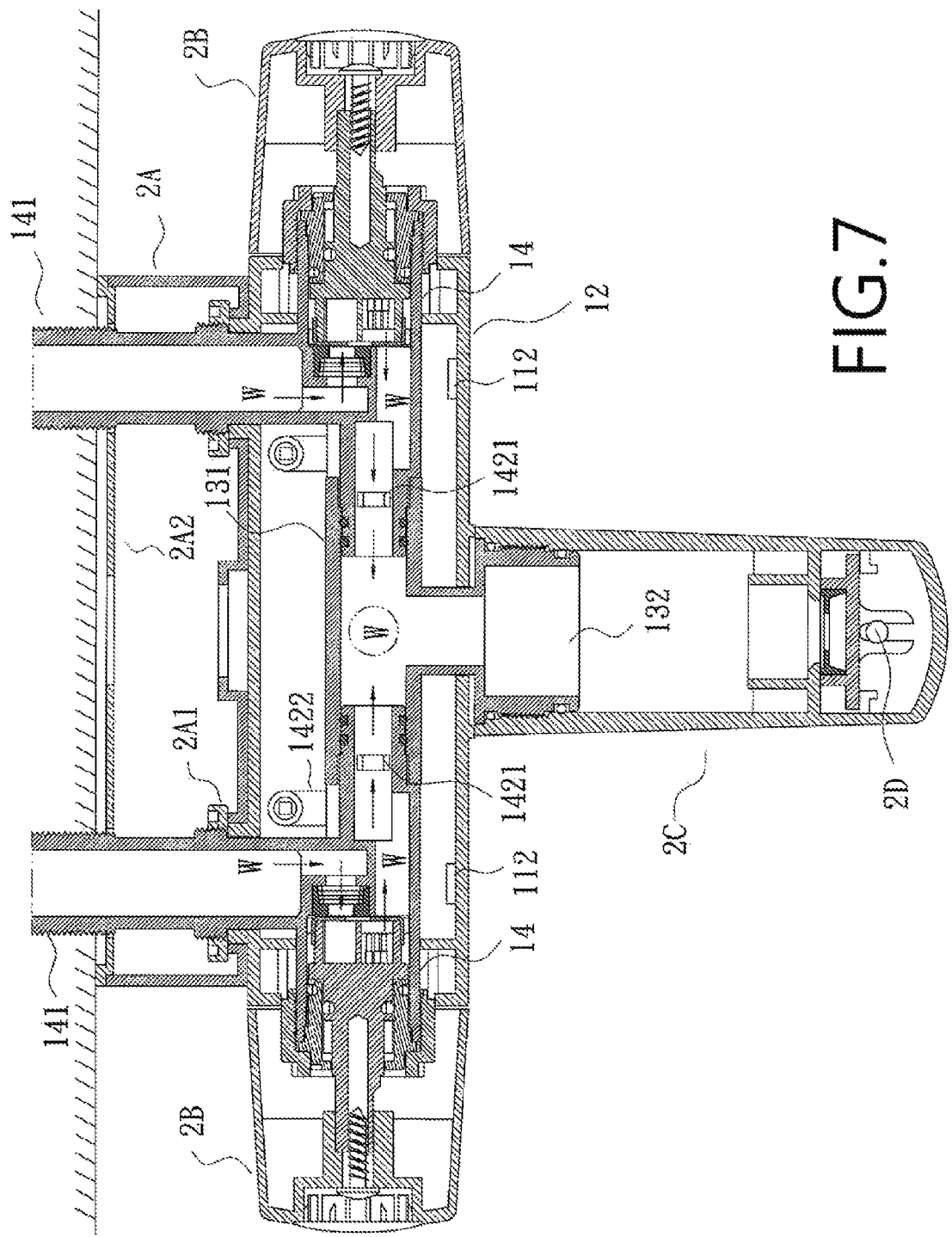
FIG. 7 is a cross-sectional view of the assembled tub faucet.
Figure 8:
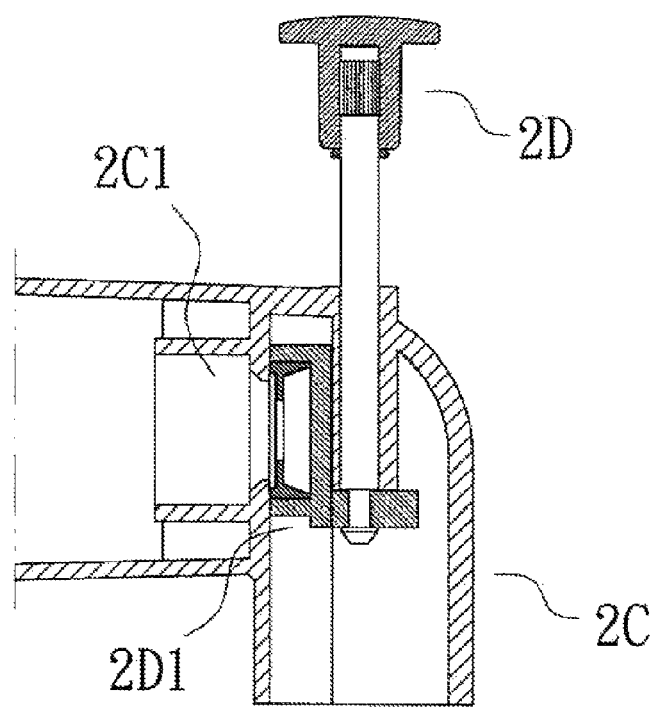
FIG. 8 is a longitudinal sectional view of the spout showing the stem being lifted to block the fluid flow.
Figure 9:
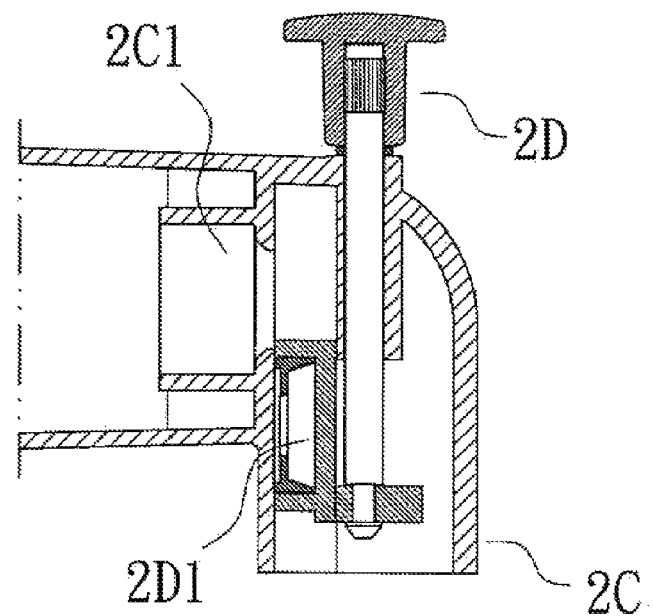
FIG. 9 is a view similar to FIG. 8 showing the stem being pushed down to allow the fluid to flow out of the spout.

Referring to FIGS. 1 to 9, a tub faucet 1 for a shower head in accordance with the invention comprises a first shell 11, a second shell 12, a first coupling 13, two second couplings 14, an escutcheon 2A, two knobs 2B, a spout 2C, and a stem 2D.

The first shell 11 includes two spaced, bossed, threaded holes 111 on an inner surface, two spaced latches 112 on the inner surface, two spaced, concave portions 113 on one edge, two concave members 114 at two ends respectively, an intermediate concave section 115 on the other edge, and a through hole 116 on a center of the top.

The second shell 12 is a mating member of the first shell 11 and includes two spaced, bossed, threaded holes 121 on an inner surface, two spaced cavities 122 on the inner surface, two spaced, concave portions 123 on one edge, two concave members 124 at two ends respectively, and an intermediate concave section 125 on the other edge.

The first coupling 13 is a four-way pipe and includes a tubular member 131 having two sets of two opposite wells 1311 at two ends respectively, an externally threaded first tube 132 perpendicular to the tubular member 131 and communicating therewith, and an externally threaded second tube 133 perpendicular to both the tubular member 131 and the first tube 132, and communicating with both the first tube 132 and the tubular member 131.

The second coupling 14 is shaped as a T and includes an externally threaded inlet 141; a tubular first joining member 142 perpendicular to the inlet 141 and communicating therewith, a, the first joining member 142 having two opposite tabs 1421 on an outer surface, a projection 1422 on the outer surface and extending parallel to the first joining member 142, and a hole 1423 through the projection 1422; and an externally threaded, tubular second joining member 143 aligned with the first joining member 142 and communicating with both the first joining member 142 and the inlet 141.

In assembly, the first joining members 142 are secured to two ends of the tubular member 131 respectively with the tabs 1421 inserted into the wells 1311 respectively. Further, two O-rings (not numbered) are mounted on the joining portion of the corresponding first joining member 142 for preventing fluid from leaking. The first shell 11 and the second shell 12 are put on upper and lower portions of the assembled first coupling 13 and the second couplings 14 respectively in which the latches 112 are in the cavities 122 respectively, the second joining members 143 are partially disposed above the concave members 124 and partially disposed under the concave members 114, and the first tube 132 is partially disposed above the concave section 125 and partially disposed under the concave section 115, the inlet 141 passes through the corresponding, complimentary concave portions 113 and 123, and the second tube 133 passes through the through hole 116.

Further, threaded fasteners (e.g., screws) 1A are driven through the threaded holes 121, the holes 1423, and the threaded holes 111 to fasten the first shell 11, the second shell 12, and the already fastened second shell 13 and the second couplings 14 together. The second couplings 14 pass through two holes (not numbered) of an escutcheon 2A, two nuts 241 and two holes (not numbered) of a mounting plate 2A2 in which the nuts 2A1 are secured to the inlets 141 respectively. Two knobs 2B are threadedly secured to the second joining members 143 respectively. A spout 2C is threadedly secured to the first tube 132. A stem 2D is adjustably, partially disposed in the spout 2C. A pipe 2E has one end connected to a shower head 2F and the other end connected to the second tube 133. A shower head 3C is connected to the second tube 133 via a hose 3B. This finishes the assembly of the invention.

In use, an individual may rotate one knob 2B to adjust cold water (as indicated by arrows and reference numerals W in FIG. 7) flowing to the first coupling 13 via one second coupling 14 and/or rotate the other knob 2B to adjust hot water (as indicated by arrows and reference numerals W in FIG. 7) flowing to the first coupling 13 via the other second coupling 14. The hot water and the cold water are mixed prior to either flowing to the shower head 2F via the pipe 2E (as indicated by arrows and reference numerals W in FIG. 7) or flowing to the spout 2C. Further, the individual may lift the stem 2D to cause a valve member 2D1 to block a port 2C1 so as to prevent water from flowing out of the spout 2C (see FIG. 8) or press down the stem 2D to cause the valve member 2D1 to clear out of the port 2C1 so as to allow water to flow out of the spout 2C through the port 2C1 (see FIG. 9).

Figures 10, 11:
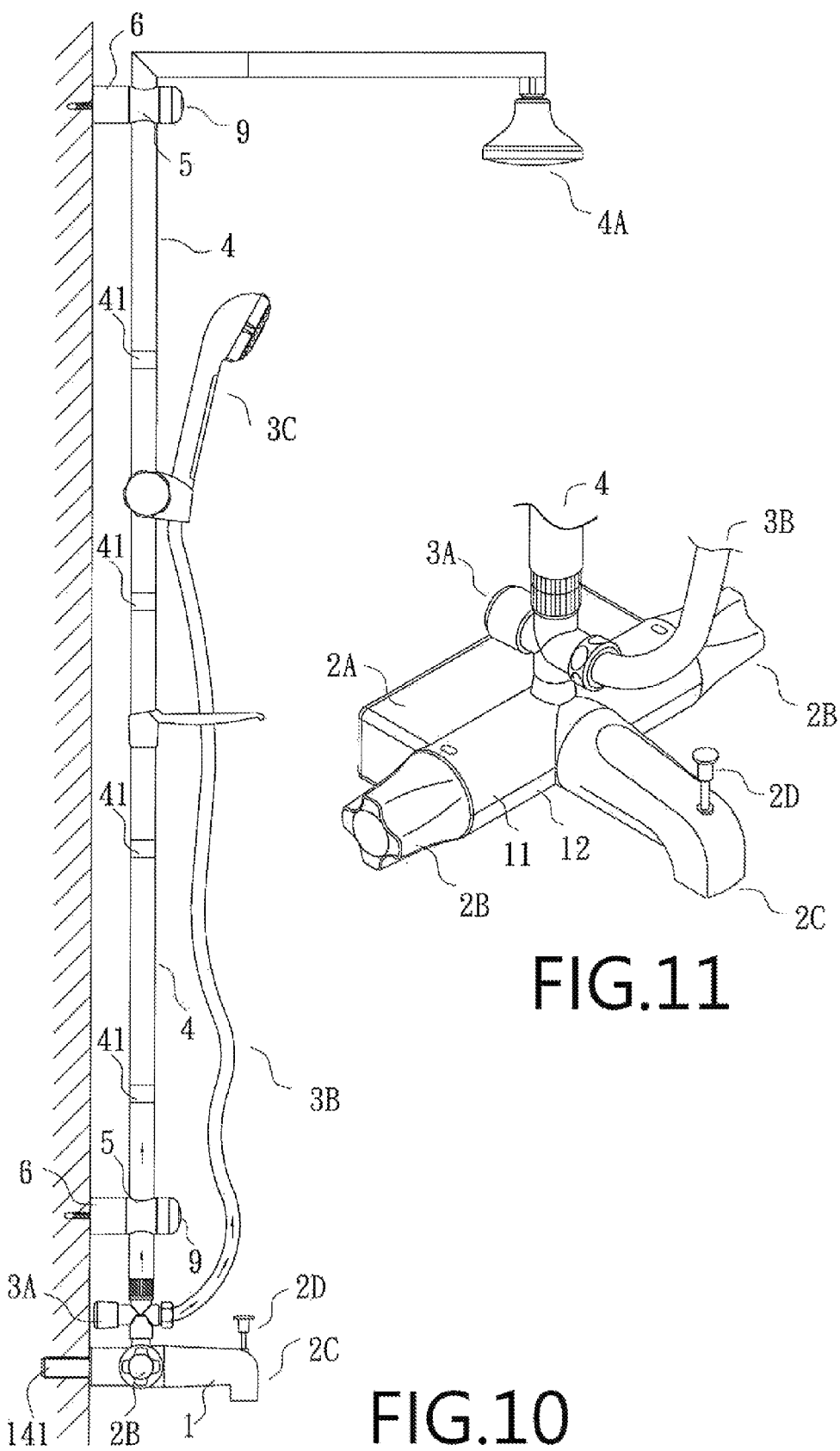
FIG. 10 is a side view showing the tub faucet connected to a shower which is secured to a wall by two mounting brackets according to the invention.
FIG. 11 is a perspective view of the lower portion of FIG. 10.
Figure 15:
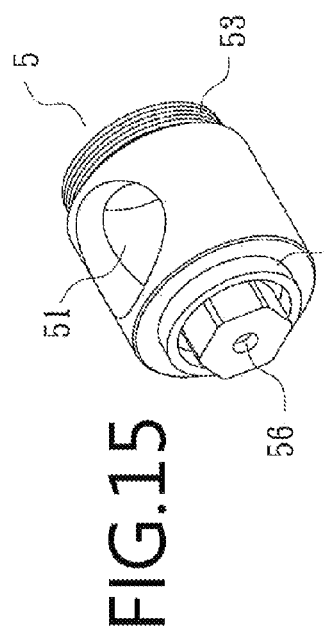
FIG. 15 is a perspective view of the main body.
Figure 14:
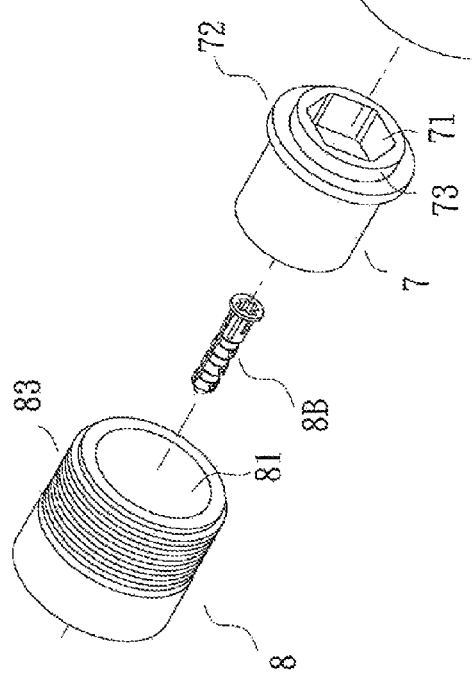
FIG. 14 is an exploded view of the mounting bracket.
Figure 16:
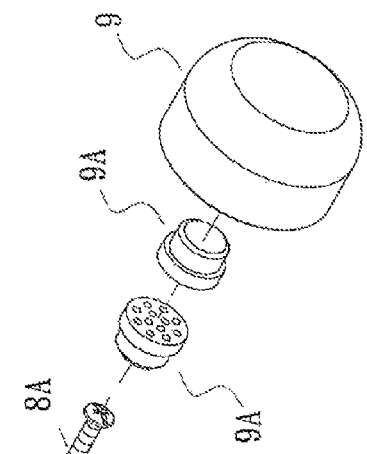
FIG. 16 is a perspective view of the cap.
Figure 17:
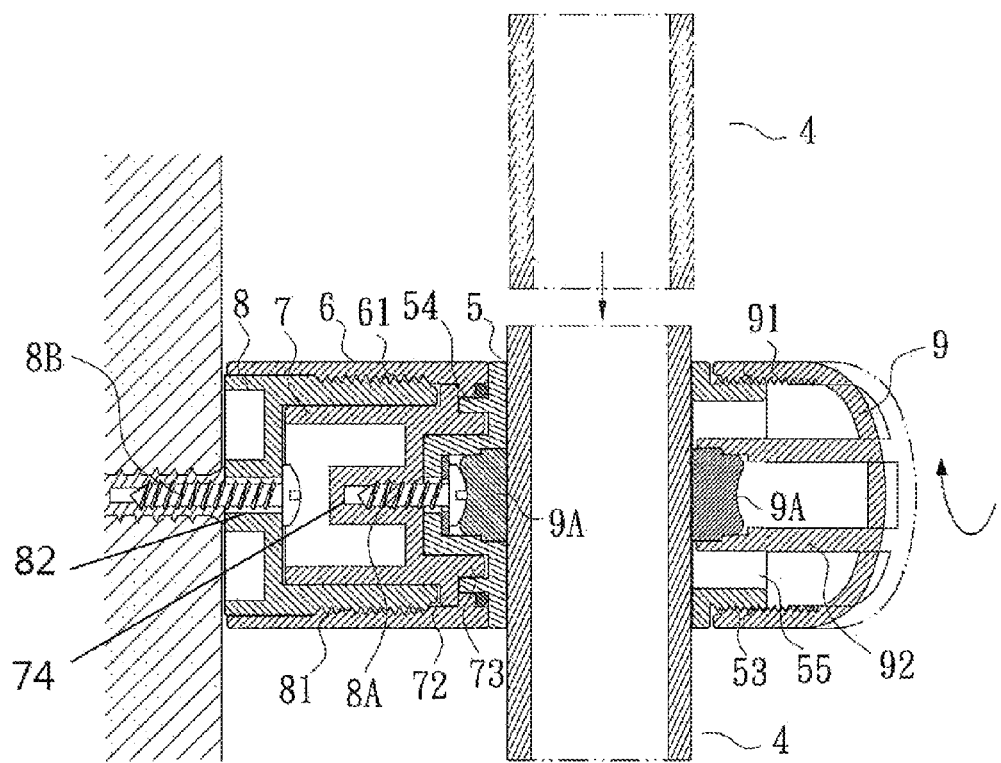
FIG. 17 is a longitudinal sectional view showing a step of mounting the pipe through the mounting bracket.
Figure 18:
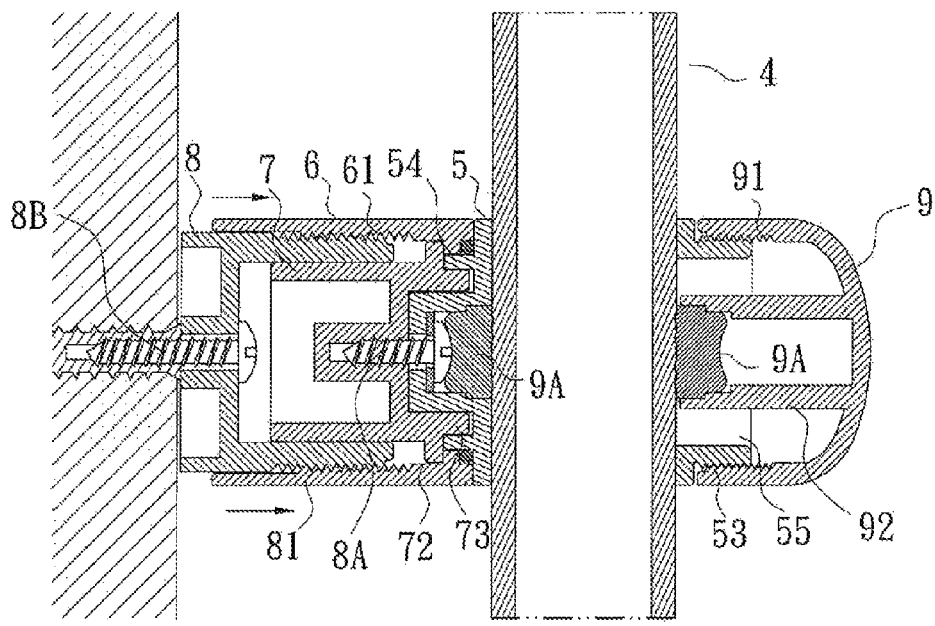
FIG. 18 is a view similar to FIG. 17 showing the pipe passing through the mounting bracket and being fastened.

Referring to FIGS. 10 to 18, a shower in accordance with the invention comprises a tub faucet 1 and a hand-held shower head 3C. Both have been discussed in above paragraphs so that a detailed description thereof is omitted herein for the sake of brevity.

The shower further comprises a fixed shower head 4A and two mounting brackets. The mounting brackets are the subject of the invention and discussed in detail below.

A cross-shaped coupling 3A has a first end port connected to the tub faucet 1, a second end port connected to a hose 3B which is in turn connected to the hand-held shower head 3C, and a third end port connected to one end of the pipe 4. The pipe 4A has the other end connected to the fixed shower head 4A. The pipe 4A includes a plurality of sections which are connected together by means of a plurality of clamping members 41 which are disposed between the two mounting brackets.

The mounting bracket comprises a hollow, cylindrical mounting member 8 including a recess 81 at a first end, a channel 82 at a second end and communicating with the recess 81, and external threads 83 on an outer surface; a screw 8B driven through the channel 82 into a wall (not numbered) to secure the mounting member 8 to the wall; a fastening element 7 including a well 71 at a first end, a protuberance 73 extending out of the first end, an annular flange 72 on the protuberance 73, and a receptacle 74 at a bottom of the well 71 wherein the fastening element 7 is partially disposed in the recess 81 and the flange 72 engages the first end of the mounting member 8; a sleeve 6 including internal threads 61 threadedly secured to the external threads 83 to fasten the sleeve 6, the fastening element 7, and the mounting member 8 together; a main body 5 including an upright channel 51, a first end opening 52, a second end opening 55, a hollow, cylindrical projection 54 extending out of the first end opening 52 and put on the protuberance 73 to engage the flange 72, an externally threaded protrusion 53 extending out of the second end opening 55, and a tunnel member 56 partially disposed in the projection 54 and projecting out of the projection 54; a screw 8A driven through the tunnel member 56 into the receptacle 74 to fasten the main body 5 and the fastening element 7 together; one of two resilient fastening members 9A disposed in the tunnel member 56 and the other resilient fastening member 9A disposed in the second end opening 55; and a cup-shaped cap 9 including internal threads 91 secured to the protrusion 53 to fasten the cap 9 and the main body 5 together, and a hollow cylinder 92 complimentarily engaged an outer surface of the other resilient fastening member 9A. It is noted that the fastening of the cap 9 and the main body 5 by rotating the cap 9 also causes the other resilient fastening member 9A to clamp the pipe 4 passing through the channel 51.

While the invention has been described in terms of preferred embodiments, those skilled in the art will recognize that the invention can be practiced with modifications within the spirit and scope of the appended claims.

What is claimed is:

1. A mounting bracket for a shower head, comprising:
 a hollow, cylindrical mounting member including a recess at a first end, a channel at a second end and communicating with the recess, and external threads formed on an outer surface;
 a first fastener driven through the channel;
 a cylindrical fastening element including a well at a first end, a protuberance extending out of the first end, an annular flange formed on the protuberance, and a receptacle at a bottom of the well wherein the fastening element is partially disposed in the recess and the flange engages the first end of the mounting member;
 a sleeve including internal threads secured to the external threads of the mounting member to fasten the sleeve, the fastening element, and the mounting member together;
 a main body including a channel configured to receive a portion of a pipe passing through, a first end opening, a second end opening, a hollow, cylindrical projection extending out of the first end opening and put on the protuberance of the fastening element to engage the flange, an externally threaded protrusion extending out of the second end opening, and a tunnel member partially disposed in the projection and projecting out of the projection;
a second fastener driven through the tunnel member into the receptacle of the fastening element to fasten the main body and the fastening element together;
a first resilient fastening member disposed in the tunnel member for clamping the pipe;
a second resilient fastening member disposed in the second end opening of the main body for clamping the pipe; and
a cup-shaped cap including internal threads secured to the protrusion of the main body to fasten the cap and the main body together, and a hollow cylinder complimentarily engaged with an outer surface of the second resilient fastening member.

* * * * *